March 2, 1971    O. RIESTER ET AL    3,567,456
PHOTOGRAPHIC DIRECT-REVERSAL EMULSIONS
Filed Nov. 29, 1967    2 Sheets-Sheet 1

INVENTORS:
OSKAR RIESTER, WOLFGANG LÄSSIG, AUGUST RANDOLPH.
BY
*Connolly and Hutz*
ATTORNEYS 3,567,456
PHOTOGRAPHIC DIRECT-REVERSAL
EMULSIONS
Oskar Riester, Leverkusen, Wolfgang Lassig, Cologne-Stammheim, and August Randolph, Leverkusen, Germany, assignors to Agfa-Gevaert Aktiengesellschaft, Leverkusen, Germany
Filed Nov. 29, 1967, Ser. No. 686,574
Claims priority, application Germany, Dec. 1, 1966, A 54,235; Apr. 12, 1967, A 55,427
Int. Cl. G03c 1/12
U.S. Cl. 96—123         18 Claims

ABSTRACT OF THE DISCLOSURE

This invention relates to photographic direct-positive emulsions which are sensitized by certain bis-thiazolyl- or selenazolyl-compounds or by a supersensitizing mixture of the said compounds with certain indole polymethine dyes.

---

Figure 1:
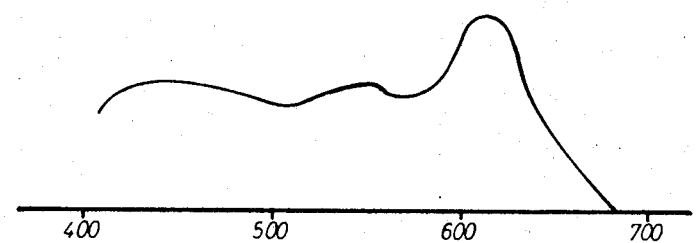

It is common practice to sensitize conventional negative silver halide emulsions with sensitizing dyes, for example, mono- or tri-methine cyanines, merocyanines or rhodacyanines.

The known sensitizing dyes, however, cannot be used to sensitize direct-positive emulsions, i.e., emulsions which, following exposure and development in the usual way, are processed to form positive images, because they generally cause flattening of the characteristic curve.

Sensitizing dyes which are to be used specifically for direct-positive emulsions are of limited utility since their sensitizing effect is insufficient.

Indocyanines which have been desirable as sensitizing dyes for direct-positive emulsions show a considerably sensitization for the red spectral region but they are still not satisfactory so far as their effectiveness is concerned. The same can be said of the direct-positive sensitizing dyes for the green spectral region, as described in British Pat. No. 970,601.

It is among the objects of the present invention to provide sensitizing dyes for direct-positive emulsions which show a sufficiently effective sensitizing activity and do not deleteriously affect the characteristic curve of the emulsion.

We now have found that compounds corresponding to the following formulae are outstanding sensitizers for direct-positive emulsions:

(I) 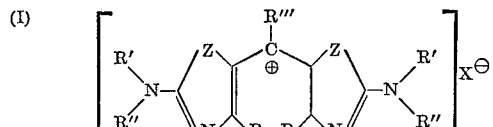

(II) 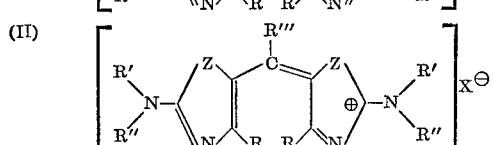

and (III) 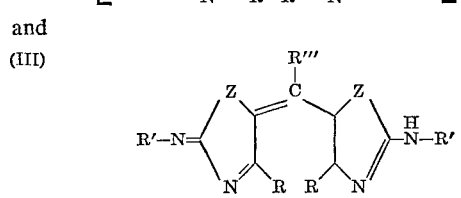

in which:
R=aryl such as phenyl or naphthyl, preferably a radical from the phenyl series;

R' and R'' each represents hydrogen; alkyl with preferably up to 5 carbon atoms such as methyl, ethyl or butyl; alkenyl with preferably up to 5 carbon atoms, such as allyl; cycloalkyl such as cyclopentyl or cyclohexyl; or aralkyl such as benzyl; or R' and R'' together with the nitrogen atom to which they are attached may form a saturated heterocyclic ring, for example, a pyrrolidine, piperidine or morpholine ring;

R''' represents hydrogen; alkyl or alkenyl with preferably up to 6 carbon atoms; cycloalkyl such as cyclohexyl or cyclopentyl; aralkyl such as benzyl; or aryl such as phenyl or naphthyl, preferably a radical from the phenyl series;

$X^{\ominus}$ represents any anion such as $Cl^-$, $Br^-$, $NO_3^-$, a toluene-sulfonic acid radical or the like; and Z represents sulfur or selenium.

The above general Formulae I and II are in mesomeric equilibrium to one another, the compounds being formulated as carbenium salts. Where R' or R'' in Formula I or II represent hydrogen, the carbenium salts can be converted into the mesomeric form characterized by Formula III through elimination of acid.

Where R' and R'' represent a radical other than hydrogen, these compounds may be present only as cations corresponding to general Formulae I and II.

TABLE A

A, 1. 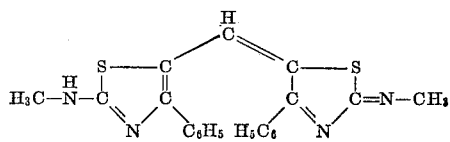

A, 2. 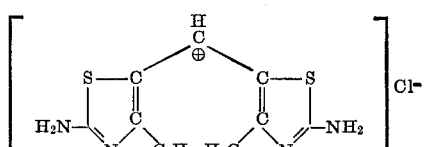

A, 3. 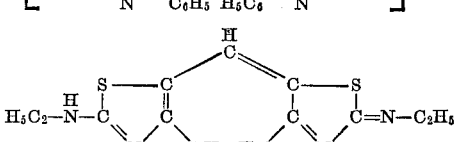

A, 4. 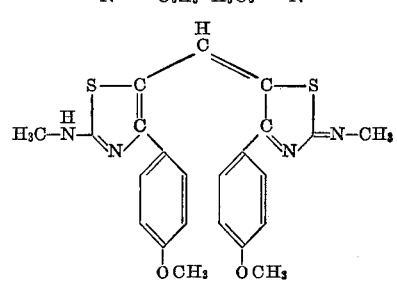

A, 5. 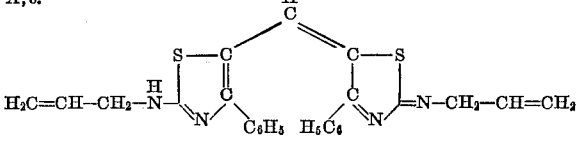

A, 6. 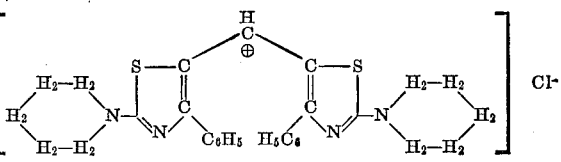

TABLE A—Continued

A,7. 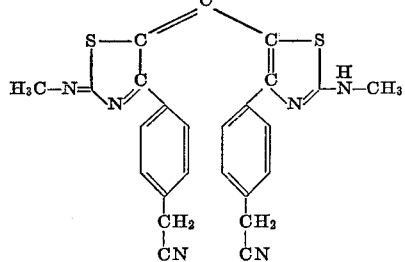

A,8. 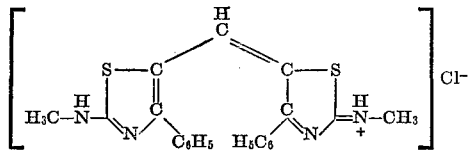

A,9. 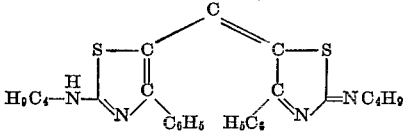

A,10. 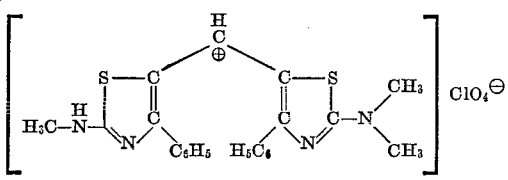

A,11. 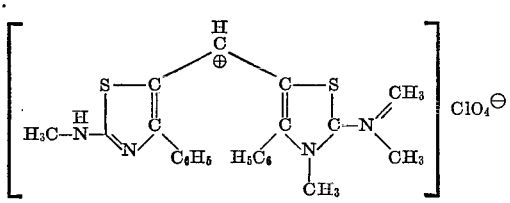

A,12. 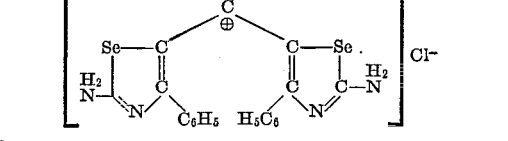

A,13. 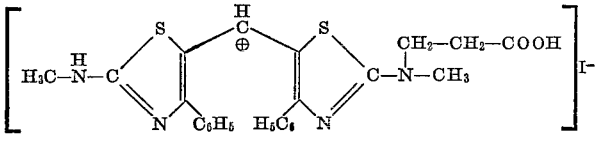

A,14. 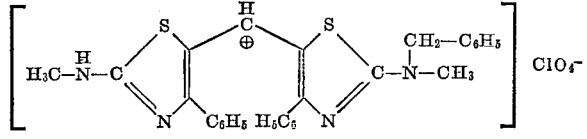

A,15. 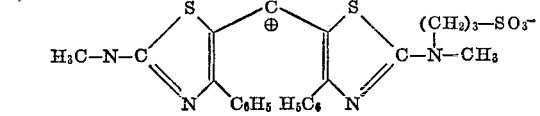

A,16. 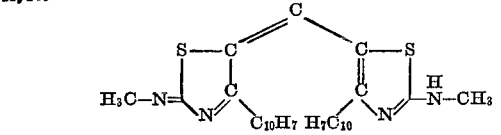

TABLE A—Continued

A,17. 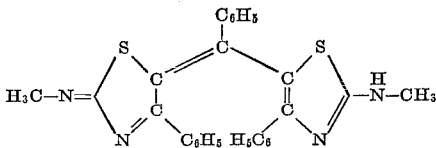

The dyes to be used in accordance with the invention may be prepared by the methods described in German Pat. No. 1,192,350 and British Pat. No. 1,002,885 or by very similar methods.

Dyes A 13–15 are obtained by heating the dye base (Formula III) with an equivalent amount of β-iodopropionic acid for 15 minutes at 140° C., benzyl bromide for 10 minutes at 120° C. (followed by anion methatesis), or propane sultone for 20 minutes at 140° C.

Dye A 16, which contains a naphthyl group in 4-position of the thiazol ring instead of a phenyl group is prepared in an analogous manner.

Another method for their preparation is described by Bogert and Chertkoff in J. Am. Chem. Soc., 46 (1924), pp. 2864–71. Accordingly, these dyes may be regarded as analogues of triphenylmethane dyes. Actually, they are distinguished from true cyanine dyes by the fact that the methine chain is attached to the thiazole or selenazole rings in the 5-position and not in the 2-position.

With normal negative emulsions, the dyes to be used in accordance with the invention have hardly any sensitizing effect and even reduce the speed and increase undesirable fogging. In the case of direct-positive emulsions, these dyes produce a spectral sensitization of particularly high intensity and outstanding steepness of the characteristic curve.

This high level of sensitization remains intact even in the presence of water-soluble or emulsified dye components. In addition, they are compatible with further conventional additives, such as wetting agents, hardeners, stabilizers and brightening agents.

The invention has the additional advantage of forming almost colourless layers so that they may in particular be used with advantage in emulsions to be applied to a paper support.

The sensitizing dyes according to the invention may be used in the form of their salts or in the form of the bases from which the salts are derived.

The preparation of direct-positive emulsions that can be sensitized with the dyes according to the invention is described inter alia in German Pats. Nos. 606,392 and 642,222 and in British Pats. Nos. 581,773 and 655,009.

The sensitizers are added to the direct-positive emulsions in the usual manner, preferably just before casting from alcoholic or aqueous-alcoholic solution. The amount added is not critical and depends on the effect desired, the kind of the emulsion etc. The optimum concentration can easily be determined by tests customarily employed in the art of emulsion making. Generally quantities of between 10 to 60 mg. per kg. of emulsion, have proved sufficient to obtain the desired results.

According to a preferred embodiment of the invention the sensitizers are applied in combination with a supersensitizing amount of di- or trimethine indole dyes of the following formulae:

(IV) 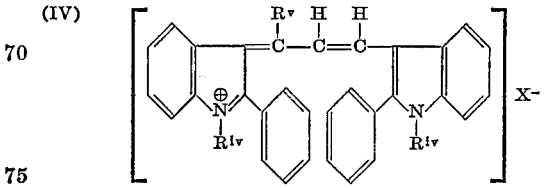

(V) 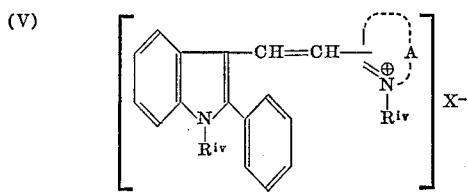

in which:

R$^{iv}$ represents an alkyl group with preferably up to 5 carbon atoms, such as methyl or ethyl;

R$^v$ represents hydrogen, an alkyl group with preferably up to 5 carbon atoms, a heterocyclic group in particular another indole ring or a thienyl ring, or a substituent of the phenyl series;

A represents a group required to complete a mono- or polynuclear heterocyclic ring, preferably a heterocyclic ring of the dihydroindole series, the thiazole, benzthiazole or naphthiazole series, the oxazole, benzoxazole or naphthoxazole series, the thiodiazole series, the oxdiazole series, the pyridine or quinoline series. This heterocyclic ring may be substituted if desired, for example by alkyl or alkoxy having preferably up to 3 carbon atoms, or halogen such as chlorine or bromine;

X represents any anion, for example, halide or alkyl sulfate.

The nature of the anion has little or no influence on the effectiveness of the sensitizer.

The benzene rings of the indoles in the above sensitizers, i.e., both the benzene ring of the indole nucleus and the phenyl nucleus attached to the 2-position of the indole, may be substituted, the first in any position, for example, by halogen, alkyl or alkoxy, having preferably up to 5 carbon atoms, and the second preferably in the p-position by alkyl, alkoxy, both having preferably up to 5 carbon atoms, aryl, particularly phenyl or halogen for instance chlorine or bromine.

Suitable dyes are shown in the following Table B:

TABLE B

B,1. 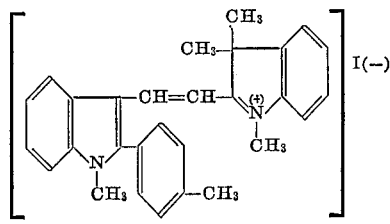

B,2. 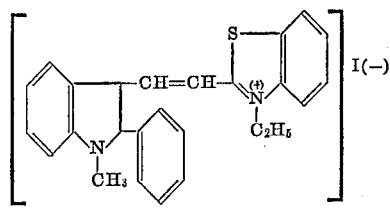

B,3. 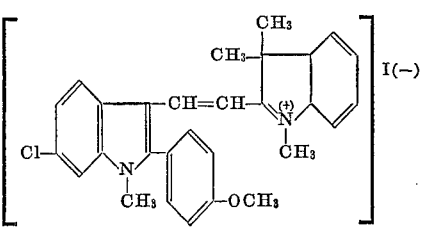

TABLE B—Continued

B,4. 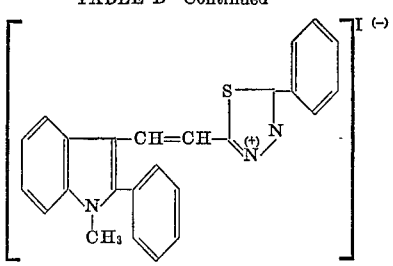

B,5. 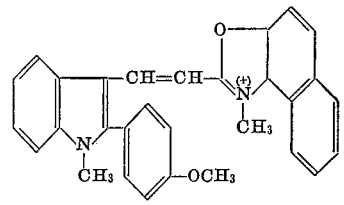

B,6. 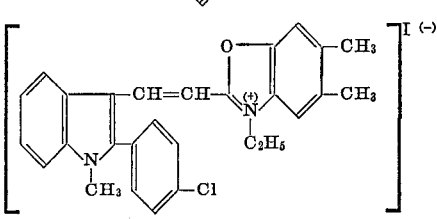

B,7. 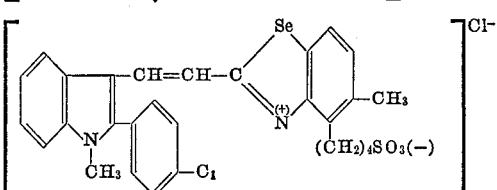

B,8. 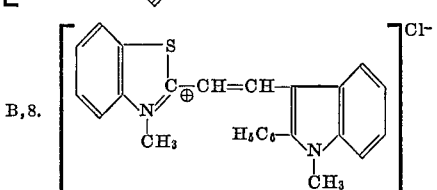

B,9. 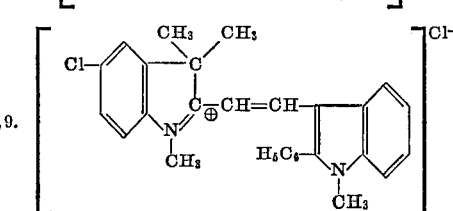

B,10. 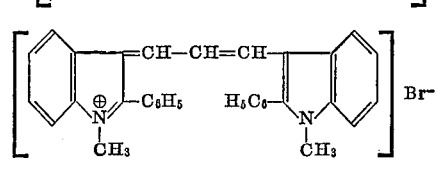

B,11. 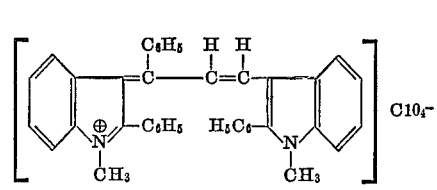

B,12. 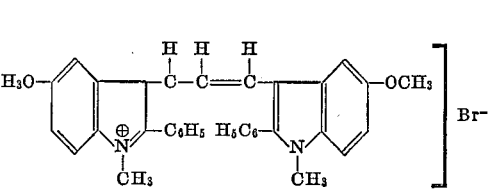

TABLE B—Continued

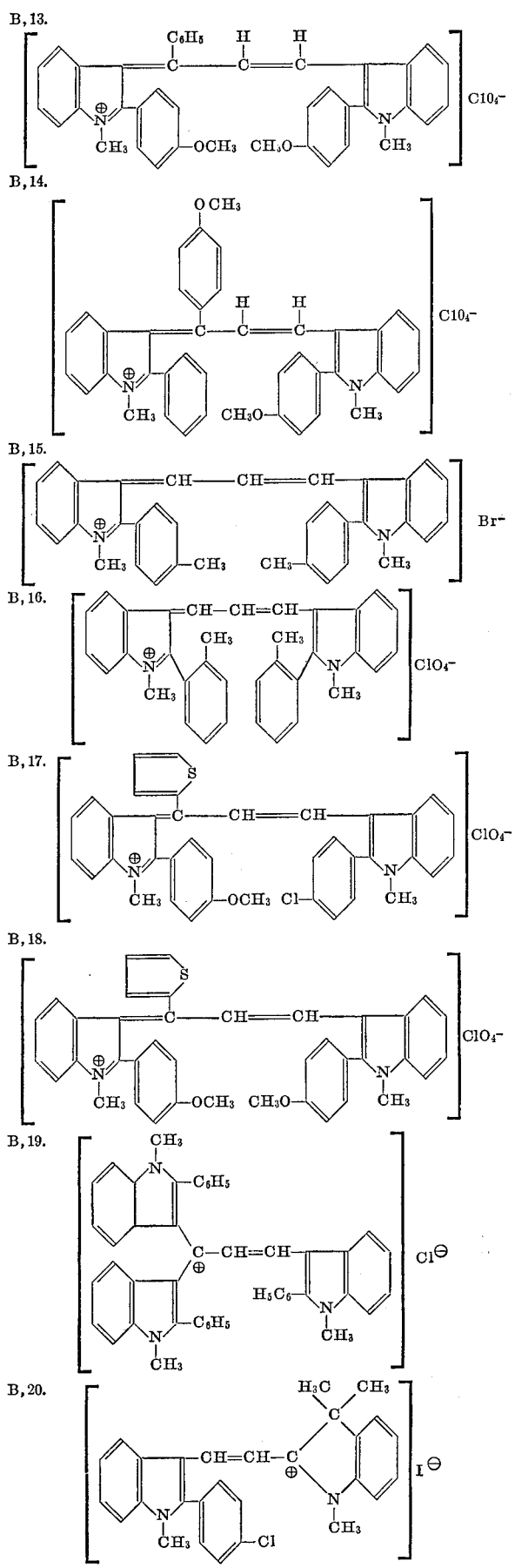

The preparation of the dyes is described in British Pats. Nos. 825,965 and 970,601.

With the combination of sensitizing dyes of the present invention photographic direct-positive emulsions with greatly improved blue sensitivity are obtained. In addition to a better threshold sensitivity, the white areas of the image, i.e., the image reversal, are also improved. Finally, addition of the super-sensitizing indole dye also improves spectral sensitivity over the entire visible region of the spectrum, so that there are no gaps in sensitivity.

The indol dyes are added to the direct-positive emulsions in the same way as the basic sensitizer. Generally an amount of 10 to 60 mg. per kg. of emulsion has proved sufficient. The ratio by weight of the basic sensitizers (Formulae I–III) to the supersensitizing dye (Formulae IV and V) is about 2:1 to 1:5.

EXAMPLE 1

45 mg. of sensitizing dye No. A,1 (1:2000 in solution in methanol) are added to one liter of a direct-positive silver bromide/gelatin emulsion containing 2.5 mol percent of silver iodide. The operation of the emulsion is based on the solarisation principle. The emulsion is chemically fogged by means of ammonia with excess silver nitrate at elevated temperatures, and then applied in the usual way onto a cellulose acetate film support.

The dried layer is exposed with white light through a test wedge in a sensitometer and developed for 5 minutes at 20° C. with a developer of the following composition:

|  | G. |
|---|---|
| p-Methylaminophenol | 3.5 |
| Sodium sulfite (anhydrous) | 60 |
| Hydroquinone | 9 |
| Soda (anhydrous) | 40 |
| Potassium bromide | 3.5 |

Make up with water to 1 liter.

Development is followed by fixing in the usual way with an aqueous solution of sodium thiosulfate. A positive image of the step wedge is obtained, showing excellent white areas and outstanding gamma.

The sensitization curve of dye A,1 has a pronounced maximum at 618 millimicrons and a second flatter maximum at about 555 millimicrons.

A distinct minimum of the actual sensitivity of the emulsion in the blue-violet spectral range is noticeable at around 515 millimicrons. The sensitization curve is shown in FIG. 1.

Figure 2:
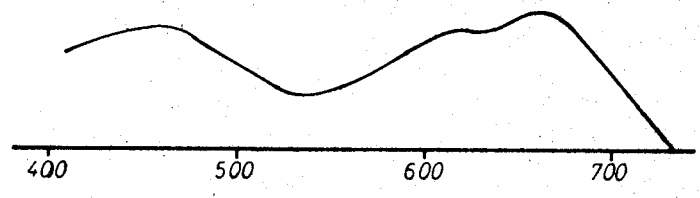

By way of comparison, FIG. 2 shows the sensitization curve of a dye described in British Pat. No. 825,965. The superiority of the dye according to the invention in regard to its intensity of sensitization is clearly visible.

Similar results are obtained by using other dyes of the type according to the invention. The spectral properties of the dyes A,2 to A,12 are as follows:

Dye A,2

Wide sensitization curve in the green to orange spectral region with maxima between 533 and 610 millimicrons.

Dye A,3

Sensitization curve with a pronounced maximum at 616 millimicrons and a wider though somewhat weaker maximum at 575 millimicrons.

Dye A,4

Steep pronounced maximum at 627 millimicrons and another wide, well-defined maximum at 563 millimicrons.

Dye A,5

Pronounced high maximum at 623 millimicrons and another wide maximum at about 575 millimicrons.

Dye A,6

Pronounced maximum at 615 millimicrons and a secondary maximum at about 575 millimicrons.

Dye A,7

Pronounced maximum at 605 millimicrons with a secondary maximum at about 560 millimicrons.

Dye A,8

Same sensitization curve as dye A,1.

Dye A,9

Rather narrow sensitization curve with a maximum at 624 millimicrons.

Dye A,10

Pronounced maximum at 612 millimicrons and others at 560 and 510 millimicrons.

Dye A,11

Prepared from dye A,1 by heating with dimethyl sulfate, followed by precipitation as perchlorate. Similar spectral properties to dye A,1.

Dye A,12

Wide sensitization from the green to the red spectral region with maxima at 545 and 625 millimicrons.

EXAMPLE 2

Dyes A,8 and B,8 are added in a quantity of 30 mg. each per kg. to a direct-positive silver bromide gelatin emulsion which was subjected to chemical fogging by means of ammonia and excess silver nitrate and which contains 0.4 mol of silver halide containing 2.5 mol percent of iodine, based on silver, per kg. of casting solution.

A sensitometric test was performed as described in Example 1. The characteristic curve was not changed but the sensitivity considerably increased by the factor 2.

Figure 3:
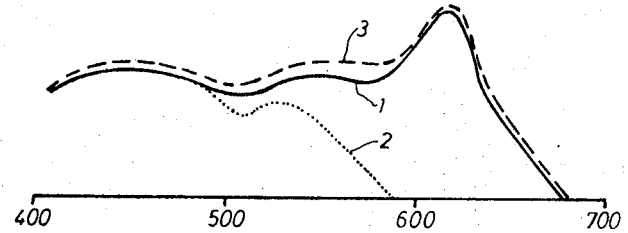

The emulsion has a pronounced maximum at 618 millimicrons, followed by wide sensitization in the green spectral region up to natural sensitivity. The sensitization curve is shown in FIG. 3, in which curve 1 is the sensitization curve of dye A,8, curve 2 that of dye B,8 and curve 3 that of the combination of both dyes.

EXAMPLE 3

Figure 4:
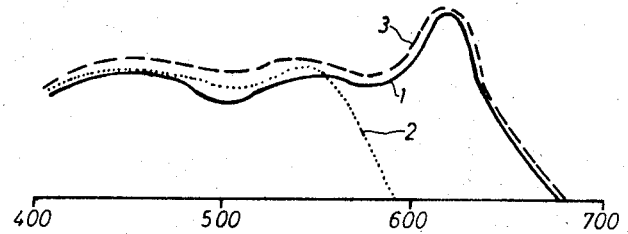

The emulsion of Example 2 was tested in the same manner with the exception that supersensitizing dye B,9 was added instead of B,8. In this case, the sensitivity maxima are at 618 millimicrons and 540 millimicrons. The sensitization curve is shown in FIG. 4, in which curve 1 is the sensitization curve of dye A,8 curve 2 that of indole dye B,9 and curve 3 that of the combination of both dyes.

EXAMPLE 4

Figure 5:
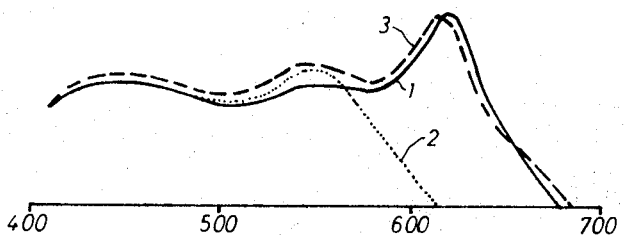

A direct positive emulsion was made as described in Example 2 with the exception that dye A,8 was replaced by dye A,3 and dye B,8 by dye B,3. Sensitometric tests show an increase in sensitivity, particularly in the green region. The maxima are at about 540 millimicrons and 615 millimicrons. The sensitization curve is shown in FIG. 5, in which curve 1 is the sensitization curve of dye A,3, curve 2 that of indole dye B,3 and curve 3 that of the combination of both dyes.

EXAMPLE 5

A direct-positive emulsion was made as described in Example 2 with the exception that dye A,8 was applied in an amount of 45 mg. per kg. of emulsion and that 15 mg. of dye B,19 was added instead of 30 mg. of dye B,8.

The resulting emulsion is sensitive towards light of the entire visible spectrum with a pronounced maximum at 615 millimicrons, two other maxima at 670 millimicrons and 560 millimicrons and an indistinct maximum at 510 millimicrons. The tris-indole dye B,19 alone provides a wide sensitization with maxima at 670 and 560 millimicrons and a distinct minimum at 520 millimicrons.

Figure 6:
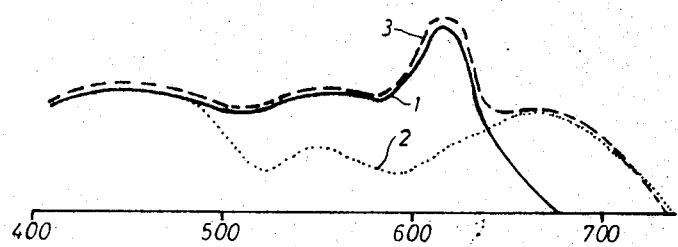

The photographic material was exposed through a grey test wedge behind yellow filters, and processed according to common practice. The sensitivity is higher by seven $\sqrt[7]{2}$ steps than that of the known tris-indole dye B,19 alone used in a concentration 60 mg./1. of emulsion. The sensitization curve of the combination is represented by curve 3 in FIG. 6, where curve 1 represents the spectral sensitization provided by thiazole dye A,8 and curve 2 the spectral sensitization provided by indole dye B,19.

EXAMPLE 6

The dyes of the invention may also be combined with one another to form a ternary mixture. For instance 20 mg. of the thiazole dye A,8, 20 mg. of the indole dye B,3 and 5 mg. of the tris-indole dye B,19, each dissolved 1:2000 in methanol, are added to 1 liter of the direct-positive emulsion described in Example 2.

The resulting emulsion is sensitive towards light of the entire visible spectrum with a maximum at about 615 millimicrons and somewhat greater intensity.

TABLE I

| | Sensitivity in steps $\sqrt[7]{2}$ | Fogging |
|---|---|---|
| 45 mg. of dye A,8 | 15 | 0.14 |
| 30 mg. of dye A,8 plus 15 mg. dye B,3 | 18 | 0.08 |
| 20 mg. of dye A,8 plus 25 mg. dye B,3 | 19 | 0.07 |
| 20 mg. of dye A,8 plus 20 mg. dye B,3 plus 5 mg. dye B,19 | 19.5 | 0.06 |

EXAMPLE 7

A direct-positive emulsion was made as described in Example 2, with the exception that dye A,13 was added in combination with dye B,20.

The resulting emulsion shows an excellent sensitivity towards light of the entire visible spectrum with 2 maxima at approximately 620 and 540 millimicrons.

Similar results were obtained with a combination of dyes A,14 and B,20. The sensitization curve then shows maxima at about 605 and 540 millimicrons.

The sensitization curve of the same emulsion sensitized, however, with an admixture of dyes A,15 and B,20 shows maxima at approximately 603 and 540 millimicrons.

We claim:
1. A photographic direct-positive emulsion sensitized by an effective amount of a sensitizing dye having the formula

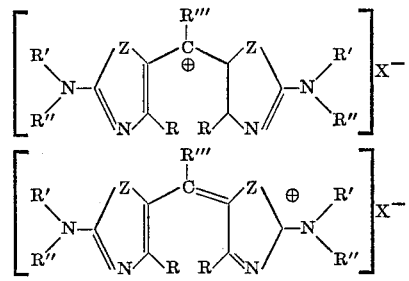

or

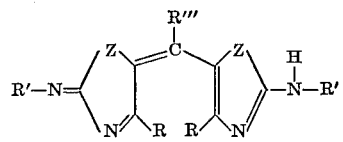

wherein:

R represents an aryl group

R' and R" each represents hydrogen, an alkyl or alkenyl group with up to 5 carbon atoms, a 5- or 6-membered cycloalkyl group or a benzyl group; or R' and R" together with the nitrogen atom to which they are attached may form a saturated heterocyclic ring;

R''' represents hydrogen, an alkyl or alkenyl group with up to 6 carbon atoms, a 5- or 6-membered cycloalkyl group, a benzyl group or a radical from the phenyl series;

X⁻ represents any photographically acceptable anion; and Z represents a sulfur or selenium atom.

2. A photographic direct-positive emulsion as claimed in claim 1, wherein R represents a radical from the phenyl series.

3. A photographic direct-positive emulsion as claimed in claim 1, wherein R''' represents hydrogen.

4. A photographic direct-positive emulsion as defined in claim 1, in which the emulsion is further sensitized by an effective amount of an indole polymethine super-sensitizing dye of the formula:

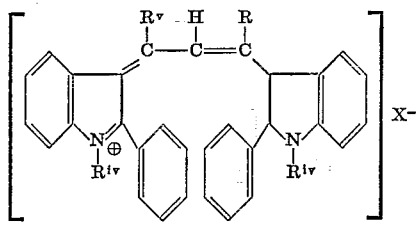

or

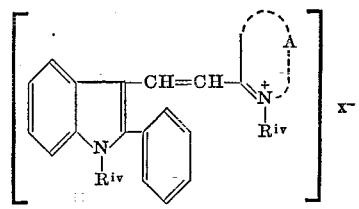

in which:

R^iv represents an alkyl group with up to 5 carbon atoms;
R^v represents hydrogen, an alkyl group with up to 5 carbon atoms, a heterocyclic group or a radical of the phenyl series;
A represents a group required to complete a mono or poly nuclear heterocyclic ring of the dihydroindole, thiazole, benzthiazole, naphthiazole, oxazole, benzoxazole, naphthoxazole, thiadiazole, oxadiazole, pyridine or quinoline series; and
X represents any photographically acceptable anion.

5. A photographic direct-positive emulsion as defined in claim 4, which contains from 30 to 60 mg. of the indole polymethine dye per litre of emulsion.

6. A photographic direct-positive emulsion as claimed in claim 1, wherein the sensitizing dye has the following formula:

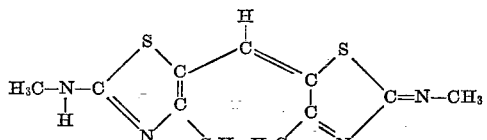

7. A photographic direct-positive emulsion as claimed in claim 4, wherein the sensitizing dye has the following formula:

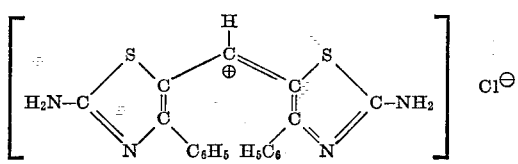

8. A photographic direct-positive emulsion as claimed in claim 2, wherein the sensitizing dye has the following formula:

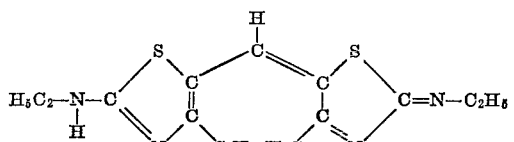

9. A photographic direct-positive emulsion as claimed in claim 2, wherein the sensitizing dye has the following formula:

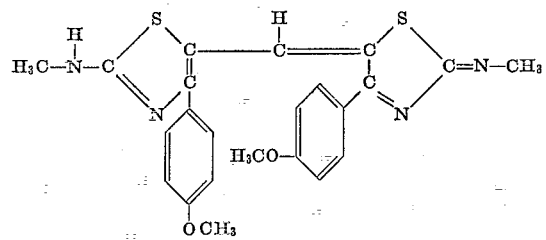

10. A photographic direct-positive emulsion as claimed in claim 2, wherein the sensitizing dye has the following formula:

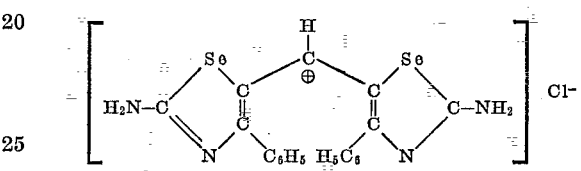

11. A photographic direct-positive emulsion sensitized by an effective amount of sensitizing dye having the formula:

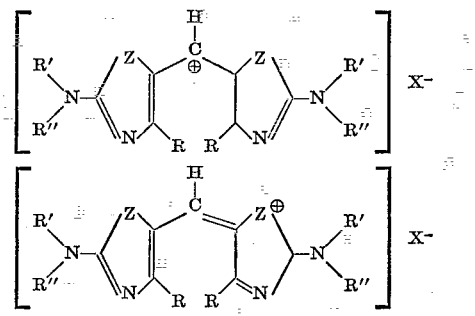

or

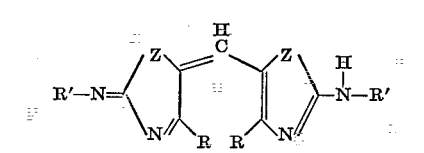

wherein:

R represents a radical of the phenyl or naphthyl series,
R' and R'' each represents hydrogen, alkyl or alkenyl having up to 5 carbon atoms, benzyl, or R' and R'' together with the N to which they are attached form a pyrrolidone, piperidine or morpholine ring;
Z represents sulfur or selenium; and
X⁻ represents any photographically acceptable anion.

12. A photographic direct-positive emulsion as defined in claim 11, in which the emulsion is further sensitized by an effective amount of a super-sensitizing indole trimethine or dimethine dye of the following formula:

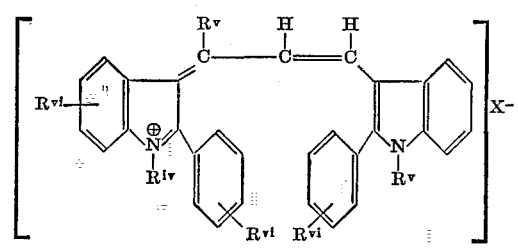

or

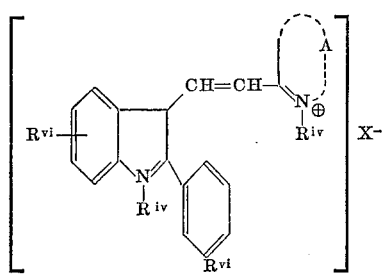

in which:

$R^{iv}$ represents alkyl having up to 5 carbon atoms;
$R^v$ stands for hydrogen, alkyl having up to 5 carbon atoms, a phenyl group or an indole or thienyl ring;
$R^{vi}$ represents hydrogen, alkyl or alkoxy having up to 5 carbon atoms or halogen;
A represents the ring members necessary for completing a ring of the dihydroindole series, thiazole, benzthiazole or naphthiazole series, the oxazole, benzoxazole or naphthoxazole series, the thiadiazole series, the oxadiazole series, or the pyridine or quinoline series and
$X^-$ stands for any photographically acceptable anion.

13. A photographic direct-positive emulsion as defined in claim 12, which contains from 30 to 60 mg. of the indole polymethine dye per liter of emulsion.

14. A photographic direct-positive emulsion as claimed in claim 12, wherein the sensitizing dye has the following formula:

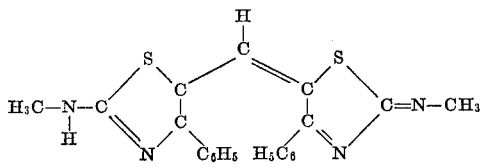

15. A photographic direct-positive emulsion as claimed in claim 11, wherein the sensitizing dye has the following formula:

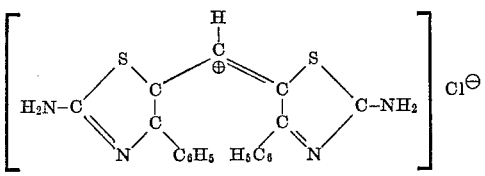

16. A photographic direct-positive emulsion as claimed in claim 12, wherein the sensitizing dye has the following formula:

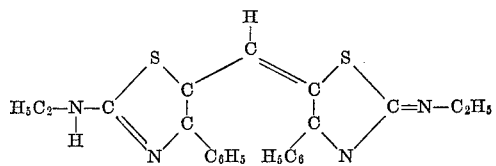

17. A photographic direct-positive emulsion as claimed in claim 12, wherein the sensitizing dye has the following formula:

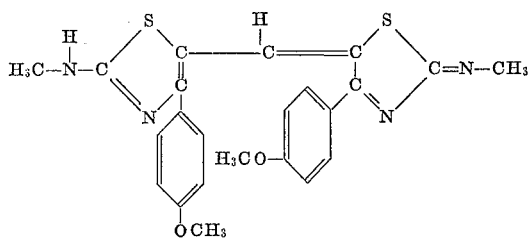

18. A photographic direct-positive emulsion as claimed in claim 12, wherein the sensitizing dye has the following formula:

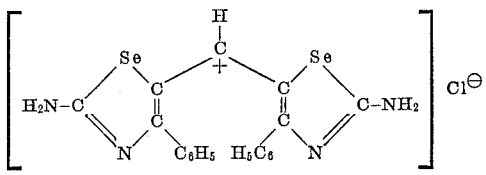

References Cited

UNITED STATES PATENTS

| | | | |
|---|---|---|---|
| 3,314,796 | 4/1967 | Gotze et al. | 96—106X |
| 3,367,779 | 2/1968 | Nakazawa et al. | 96—101 |

WILLIAM D. MARTIN, Primary Examiner

T. G. DAVIS, Assistant Examiner

U.S. Cl. X.R.

96—101, 102, 104